United States Patent
Park et al.

(10) Patent No.: US 7,471,037 B2
(45) Date of Patent: Dec. 30, 2008

(54) FLAT FLUORESCENT LAMP WITH DISCHARGE UNIFORMITY

(75) Inventors: Deuk Il Park, Suwon-shi (KR); Choong Yop Rhew, Suwon-shi (KR); Young Jin Hyun, Suwon-shi (KR)

(73) Assignee: LS Tech Co., Ltd., Pyeongtaek-Shi Kyungki-Do (KR)

( * ) Notice: Subject to any disclaimer, the term of this patent is extended or adjusted under 35 U.S.C. 154(b) by 430 days.

(21) Appl. No.: 11/164,986

(22) Filed: Dec. 13, 2005

(65) Prior Publication Data

US 2006/0181193 A1    Aug. 17, 2006

(30) Foreign Application Priority Data

Jan. 24, 2005    (KR) .................. 10-2005-0006211

(51) Int. Cl.
*H01J 1/62*    (2006.01)

(52) U.S. Cl. ...................... 313/493; 313/634

(58) Field of Classification Search ................. 313/493, 313/634
See application file for complete search history.

(56) References Cited

U.S. PATENT DOCUMENTS

| | | |
|---|---|---|
| 5,343,116 A | 8/1994 | Winsor |
| 5,463,274 A | 10/1995 | Winsor |
| 5,466,990 A | 11/1995 | Winsor |
| 5,479,069 A | 12/1995 | Winsor |
| 5,536,999 A | 7/1996 | Winsor |
| 5,818,164 A | 10/1998 | Winsor |
| 5,850,122 A | 12/1998 | Winsor |
| 5,903,096 A | 5/1999 | Winsor |
| 5,914,560 A | 6/1999 | Winsor |
| 6,075,320 A | 6/2000 | Winsor |
| 6,100,635 A | 8/2000 | Winsor |
| 6,127,780 A | 10/2000 | Winsor |
| 6,762,556 B2 | 7/2004 | Winsor |
| 2002/0021564 A1 | 2/2002 | Cho et al. |
| 2002/0117959 A1 | 8/2002 | Winsor |
| 2003/0034731 A1 | 2/2003 | Masahiro et al. |
| 2005/0116607 A1 | 6/2005 | Park et al. |
| 2005/0135080 A1 | 6/2005 | Winsor |

FOREIGN PATENT DOCUMENTS

| | | |
|---|---|---|
| JP | 60216435 | 10/1985 |
| KR | 1020000065759 | 11/2000 |
| KR | 1020010044259 | 6/2001 |
| KR | 1020010079377 | 8/2001 |

(Continued)

*Primary Examiner*—Vip Patel
(74) *Attorney, Agent, or Firm*—IPLA P.A.; James E. Bame (57) ABSTRACT

A flat fluorescent lamp with discharge uniformity is provided. The lamp includes a first substrate and a second substrate having discharge electrodes; a sidewall corresponding to a frame of any one of the two substrates; and a plurality of serpentine shaped discharge channels defined by the sidewall, first barrier ribs, and second barrier ribs, and having serpentine shaped widths corresponding to horizontal pitches between the left/right sidewall and the first barrier rib and between the first barrier ribs, and having discharge channel widths corresponding to vertical pitches between the second barrier ribs, wherein the serpentine shaped discharge channel is varied in length depending on its position within the flat fluorescent lamp.

12 Claims, 9 Drawing Sheets

FOREIGN PATENT DOCUMENTS

| | | |
|---|---|---|
| KR | 1020020068123 | 8/2002 |
| KR | 1020020069292 | 8/2002 |
| KR | 1020020072260 | 9/2002 |
| KR | 1020020091419 | 12/2002 |
| KR | 1020030096193 | 12/2003 |
| KR | 1020040004240 | 1/2004 |
| KR | 1020040013020 | 2/2004 |
| KR | 1020040014037 | 2/2004 |
| KR | 1020050070989 | 7/2005 |
| WO | WO 9939553 | 8/1999 |

FLAT FLUORESCENT LAMP WITH DISCHARGE UNIFORMITY

BACKGROUND OF THE INVENTION

1. Field of the Invention

The present invention relates to a flat fluorescent lamp having a plurality of serpentine shaped discharge channels, and more particularly, to a flat fluorescent lamp for minimizing a deviation of discharge between discharge channels, thereby reducing a discharge initiation voltage, and enhancing luminance uniformity.

2. Description of the Related Art

In general, a liquid crystal display (LCD) among flat display devices employs a backlight source unit such as a cold cathode fluorescent lamp (CCFL), an external electrode fluorescent lamp (EFFL), a flat fluorescent lamp (FFL), and a light emitting diode (LED).

The CCFL already tested in reliability for a long time is being much used for a thin film transistor LCD (TFT LCD).

As a backlight type using the CCFL, there are a direct type CCFL and an edge type CCFL.

The direct type CCFL uses tens of lamps. Therefore, it has a drawback in that the used lamps become an obstacle in securing a reliability of the LCD and increase an assembly cost, thereby deteriorating economy.

The edge type CCFL is disposed at an end of a light guide plate and irradiates light. Therefore, it has a limitation in providing a necessary luminance to a large-sized liquid crystal display panel since the number of lamps used is limited.

Because of the above drawback of the CCFL, in recent years, it is being positively considered that the flat fluorescent lamp is employed as the backlight unit. The flat fluorescent lamp is advantageous of simultaneously satisfying a luminance and a reliability of lamp while improving an optic efficiency and reducing a manufacture cost of a liquid crystal display apparatus.

In general, the flat fluorescent lamp is classified as a CCFL type flat fluorescent lamp and an EEFL type flat fluorescent lamp.

In the CCFL type flat fluorescent lamp, discharge channels are all partitioned using a barrier rib while being extended as one serpentine shaped channel, and internal electrodes are disposed to face at a start and an end of the discharge channel, and a phosphorous film is coated within the long discharge channel.

However, the CCFL type flat fluorescent lamp requires a high discharge initiation voltage in proportion to a length of the discharge channel due to the very long discharge channel. In other words, the CCFL type flat fluorescent lamp requires a high voltage of tens of kilo volts for lighting, thereby increasing an output voltage of an inverter and causing a power loss resulting from an interference of electromagnetic wave and a leakage voltage. Due to this drawback of the CCFL type flat fluorescent lamp, it is difficult to use at a home a liquid crystal display apparatus employing the CCFL type flat fluorescent lamp serving as the backlight unit.

On the contrary, in the EEFL type flat fluorescent lamp, an electrode is positioned outside both ends of a glass substrate including a discharge channel, thereby making it possible to perform a discharge at a shorter distance than in the CCFL type flat fluorescent lamp. Therefore, the EEFL type flat fluorescent lamp can perform the discharge at a low voltage to seek a stable discharge. Further, in the EEFL type flat fluorescent lamp, the electrode can be also installed with a great convenience.

However, in the EEFL type flat fluorescent lamp using the external electrode, a wider electrode area should be secured to allow flow of a sufficient current, thereby providing a desired luminance. Therefore, a dead space of the lamp is increased, thereby deteriorating an appearance of the lamp. Further, the EEFL type flat fluorescent lamp includes a plurality of horizontal discharge channels. Therefore, the EEFL type flat fluorescent lamp has a drawback in that an excessive power is consumed to obtain a proper current density at each discharge channel. Further, in case where the discharge channel is reduced in section area to obtain the proper current density, the discharge channel is increased in number and a barrier rib is increased in width. If the number of the discharge channels is increased as above, power consumption is increased, and if the barrier rib is increased in width, a dark region caused by the barrier rib is increased. Further, in order to remove the dark region, diffusion plates should be spaced apart at an upper end of the lamp and therefore, there occurs a serious drawback of increasing a thickness of a backlight unit.

This applicant has ever made various efforts to solve the above drawback of a reduction of efficiency of a surface discharge type flat fluorescent lamp. As a result, this applicant has filed applications for inventions relating with the flat fluorescent lamp, such as Korean Patent Application No. 1020040005829 (2004 Jul. 26) entitled "flat fluorescent lamp with improved discharge efficiency", Korean Patent Application No. 1020040058291 (2004 Jul. 26) entitled "flat fluorescent lamp with improved discharge efficiency", Korean Patent Application No. 1020040072846 (2004 Sep. 11) entitled "thin flat fluorescent lamp", and has ever proposed a structure employing a plurality of respective independent serpentine-shaped discharge channels by improving the EEFL type flat fluorescent lamp, for increasing a current density of a discharge channel to improve an efficiency of discharge and a luminance, improving an electrode structure to reduce a discharge initiation voltage, and solving a drawback of a non-emission region caused by an external electrode through a design of an electrode space having a greater width than the discharge channel.

Hereinafter, a construction of the "flat fluorescent lamp with improved discharge efficiency" will be described with reference to the drawing.

Figure 1:
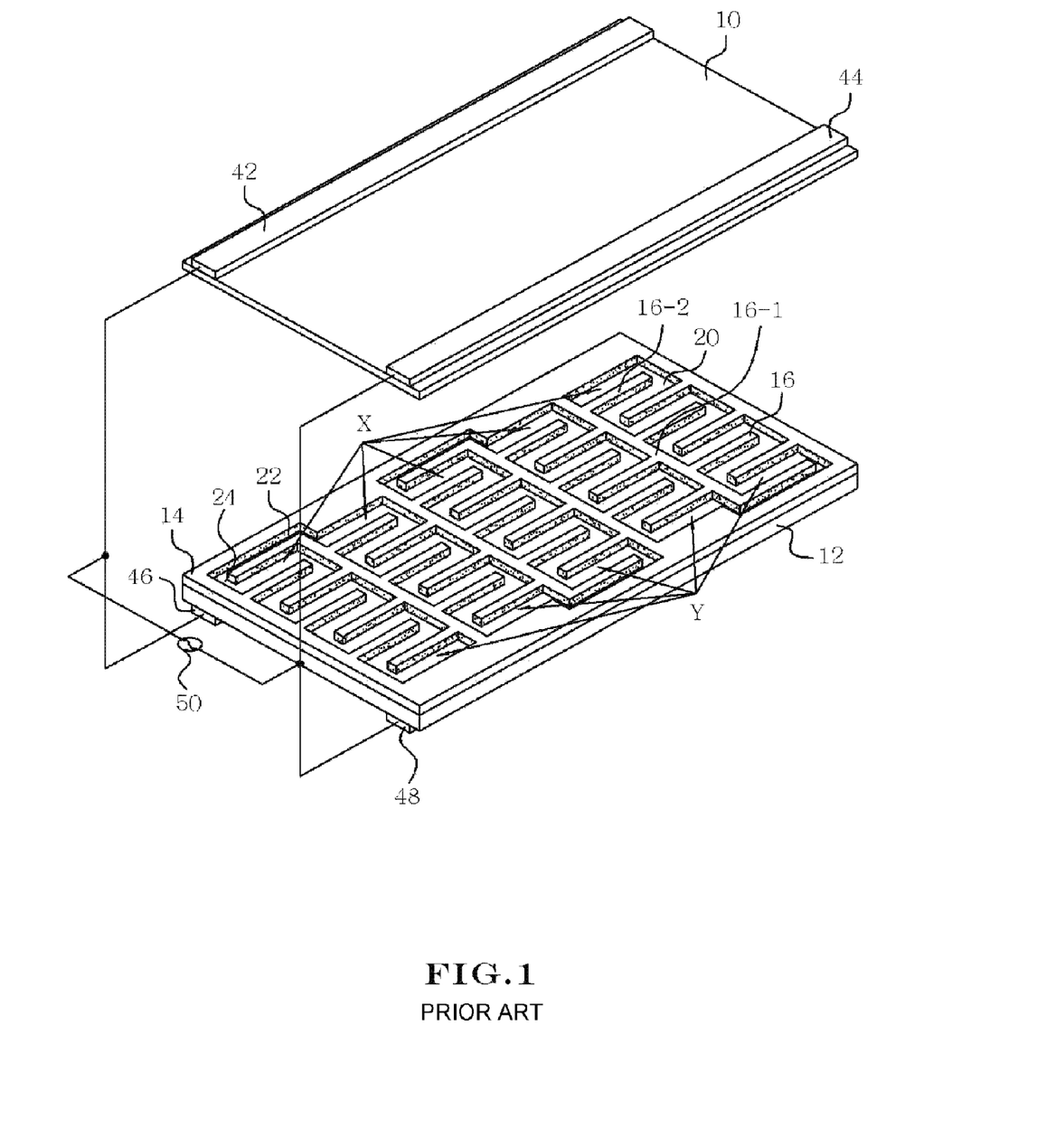
FIG. 1 is a perspective view illustrating a construction of a conventional flat fluorescent lamp having a serpentine shaped discharge channel.

FIG. 1 is a perspective view illustrating a construction of the conventional flat fluorescent lamp having a serpentine shaped discharge channel.

Referring to FIG. 1, the flat fluorescent lamp includes a front substrate 10 and a rear substrate 12.

The front substrate 10 includes a power supply unit 50, and two external electrodes, that is, a first external electrode 42 and a second external electrode 44 connected with the power supply unit 50.

The rear substrate 12 includes two external electrodes, that is, a third external electrode 46 and a fourth external electrode 48, a sidewall 14, a barrier rib 16, a discharge channel 20, an exhaust channel 22, a connection unit 24, and a frit glass 340.

The front substrate 10 and the rear substrate 12 are coupled by the sidewall 14 formed at an end of the rear substrate 12 as shown in FIG. 1.

A reflective layer (not shown) such as $Al_2O_3$ can be coated under the rear substrate 12.

The discharge channel 20 and the exhaust channel 22 are defined using the sidewall 14 and the barrier rib 16, and the front substrate 10 are adhered onto upper surfaces of the sidewall 14 and the barrier rib 16.

For description convenience, a first barrier rib 16-1 denotes a long-axis barrier rib for forming the barrier rib 16 in a serpentine shape, and a second barrier rib 16-2 denotes a short-axis barrier rib.

The discharge channel 20 has a serpentine shape that is defined by the sidewall 14 serving as a frame of the flat fluorescent lamp, and a plurality of the barrier ribs 16 that are comprised of the first barrier ribs 16-1 perpendicularly alternately connected to the upper/lower sidewall 14, and the second barrier ribs 16-2 each integrated with and perpendicularly alternately connected to both of the first barrier ribs 16-1 in an opposite direction to be spaced apart from each other. The serpentine shaped discharge channel 20 is connected at its end with the vertical exhaust channel 22 arranged at the sidewall 14, through the connection unit 24. The respective ends of the discharge channels 20 are used as electrode spaces of the exhaust channels 22 arranged in mutually opposite directions.

In detail, the first and second external electrodes 42 and 44 are disposed outside the front substrate 10, and the third and fourth external electrodes 46 and 48 are disposed outside the rear substrate 12 to have a band shape. The first external electrode 42 of the front substrate 10 and the third external electrode 46 of the rear substrate 12 are bound together, and the second external electrode of the front substrate 10 and the fourth external electrode 48 of the rear substrate 12 are bound together, to receive an alternating current from the power supply unit 50 and alternately generating a discharge initiation voltage depending on a frequency of the alternating current source. In other words, at both ends of the discharge channels, that is, at ends of the discharge channels disposed closely to the external electrodes 42 and 46, and 44 and 48, the discharge initiation voltage is generated depending on the frequency of the alternating current source. However, as going to a center of the discharge channel, the discharge initiation voltage gets lower. In other words, the discharge channel has a greater discharge initiation voltage at both ends than at a center.

As described above, in the conventional flat fluorescent lamp, the plurality of serpentine shaped discharge channels arranged within the lamp have the greater discharge initiation voltage, as going to the both ends, than at the center. Therefore, the conventional flat fluorescent lamp has a drawback of locally decreasing brightness as going to the both ends.

Accordingly, in the conventional flat fluorescent lamp, the greater discharge initiation voltage than in a normal condition should be applied in order to obtain the stable discharge. Therefore, there is a drawback of complicating a circuit construction and having a difficulty in obtaining greater luminance uniformity.

SUMMARY OF THE INVENTION

Accordingly, the present invention is directed to a flat fluorescent lamp with discharge uniformity that substantially overcomes one or more of the limitations and disadvantages of the conventional art.

One object of the present invention is to provide a flat fluorescent lamp for minimizing a deviation of discharge between channels, thereby reducing a discharge initiation voltage, and enhancing luminance uniformity.

Another object of the present invention is to provide a flat fluorescent lamp having a plurality of serpentine shaped discharge channels, and varying a horizontal pitch of the discharge channel depending on a position of the discharge channel to minimize a deviation of discharge between the channels, thereby reducing a discharge initiation voltage, and to enhance luminance uniformity.

A further another object of the present invention is to provide a flat fluorescent lamp having a plurality of serpentine shaped discharge channels, and varying a discharge channel width of each of the discharge channels provided between second barrier ribs to minimize a deviation of discharge between the discharge channels, thereby reducing a discharge initiation voltage, and to enhance luminance uniformity.

A still another object of the present invention is to provide a flat fluorescent lamp having a plurality of serpentine shaped discharge channels, and varying a width of a discharge electrode for providing a discharge initiation voltage to the discharge channels to minimize a deviation of discharge between the discharge channels, thereby reducing the discharge initiation voltage, and to enhance luminance uniformity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a flat fluorescent lamp with a discharge uniformity, the lamp including: a first substrate and a second substrate having discharge electrodes; a sidewall corresponding to a frame of any one of the two substrates; and a plurality of serpentine shaped discharge channels defined by the sidewall, first barrier ribs, and second barrier ribs, and having serpentine shaped widths corresponding to horizontal pitches between the left/right sidewall and the first barrier rib and between the first barrier ribs, and having discharge channel widths corresponding to vertical pitches between the second barrier ribs, wherein the serpentine shaped discharge channel is varied in length depending on its position within the flat fluorescent lamp.

In another aspect of the present invention, there is provided a flat fluorescent lamp with a discharge uniformity, the lamp including: a first substrate and a second substrate having discharge electrodes; a sidewall corresponding to a frame of any one of the two substrates; and a plurality of serpentine shaped discharge channels defined by the sidewall, first barrier ribs, and second barrier ribs, and having serpentine shaped widths corresponding to horizontal pitches between the left/right sidewall and the first barrier rib and between the first barrier ribs, and having a discharge space defined by the second barrier ribs, and having an electrode space having an electrode space width that is defined by the upper/lower sidewall and the second barrier rib and corresponds to a vertical pitch between the upper/lower sidewall and the second barrier rib, wherein a width of the discharge electrode is varied depending on a position of the discharge channel within the flat fluorescent lamp.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s)

of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numerals will be used throughout the drawings to refer to the same or like parts.

The present invention provides a flap fluorescent lamp for preventing a reduction of luminance and a rise of discharge initiation voltage at both ends of a discharge channel, thereby enhancing luminance uniformity.

In order to prevent the reduction of luminance and the rise of discharge initiation voltage, three methods are provided as follows.

In the first method, there is provided a flat fluorescent lamp having a plurality of serpentine shaped discharge channels, and varying a horizontal pitch of the discharge channel depending on a position of the discharge channel, in which a both-end discharge channel is constructed to have a less horizontal pitch than a central discharge channel, thereby shortening a length of the both-end discharge channel.

In the second method, there is provided a flat fluorescent lamp having a plurality of serpentine shaped discharge channels and varying a discharge channel width of each of the discharge channels provided between second barrier ribs, in which a central discharge channel has a narrower channel width and, as going to both ends, a both-end discharge channel has a wider channel width to shorten its length.

In the third method, there is provided a flat fluorescent lamp having a plurality of serpentine shaped discharge channels, and varying a discharge electrode width of a discharge electrode depending on a position of the discharge channel, in which the discharge electrode is disposed at an outer wall of the lamp to correspond to an electrode space connected at ends of both of the discharge channels and provides a discharge initiation voltage, and the discharge electrode width gets narrower at a center and gets wider at both ends.

Hereinafter, the above methods will be described with reference to the attached drawings. Here, a serpentine shaped width refers to a width defined between first barrier ribs 16-1, a discharge channel width refers to a discharge space defined by the left/right sidewall 14, the first barrier rib 16-1, and second barrier ribs 16-2, an electrode space width refers to a width defined by the upper/lower sidewall 14 and the second barrier rib 16-2, and a discharge electrode width refers to a height of the discharge electrode long formed to be perpendicular to the discharge channel.

Figure 2:
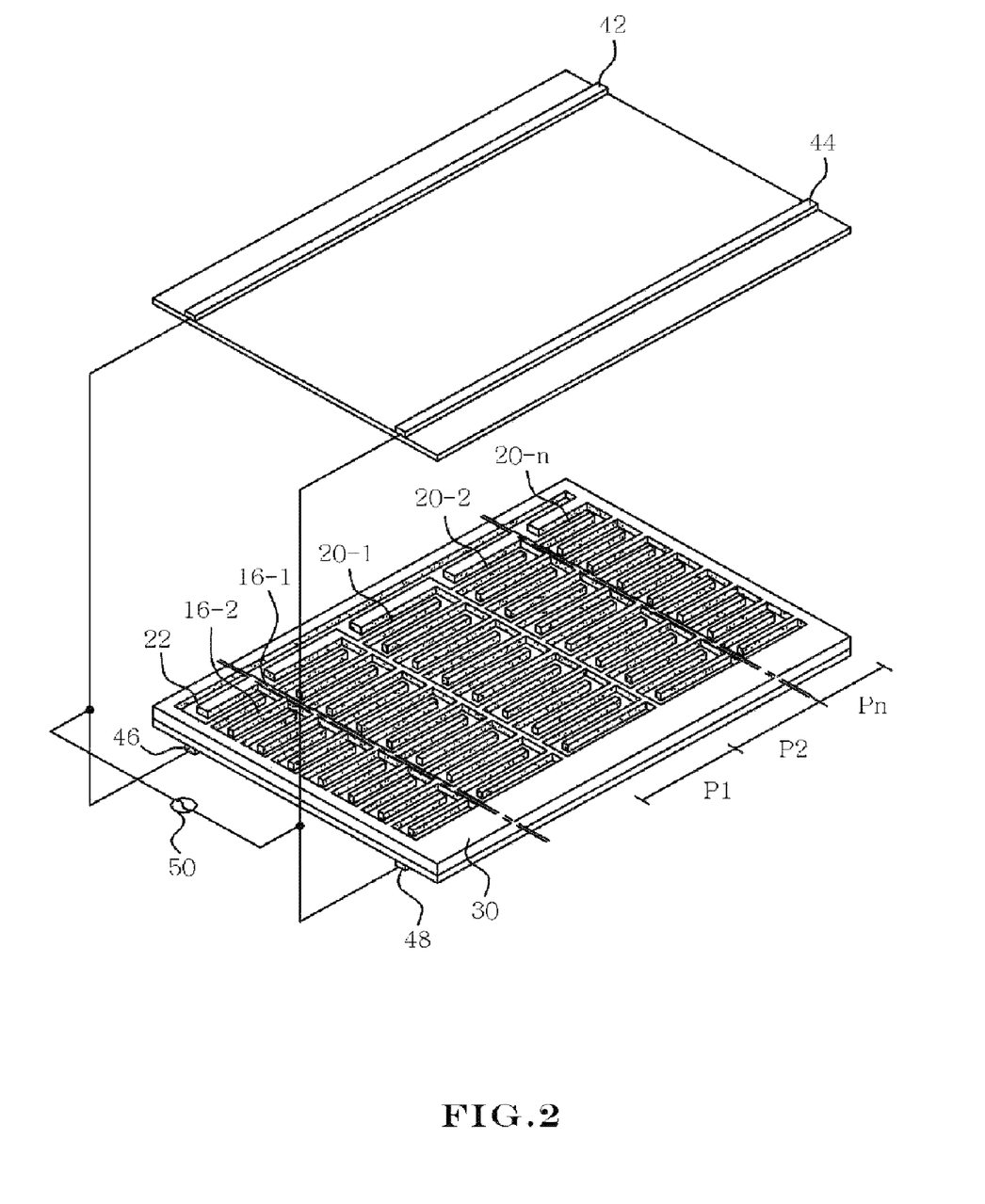
FIG. 2 is a perspective view illustrating a flat fluorescent lamp having a serpentine shaped discharge channel according to the first embodiment of the present invention.
Figure 3:
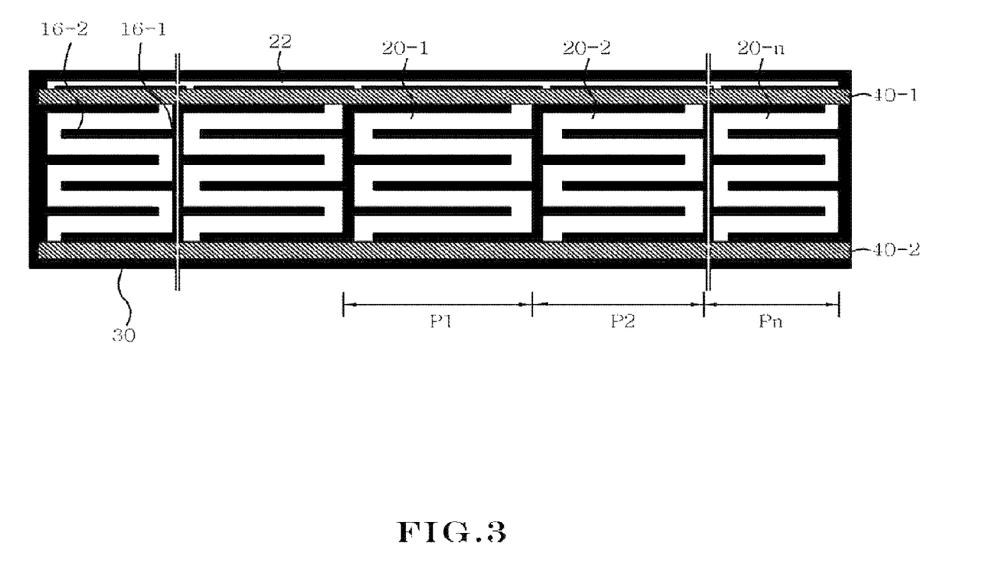
FIG. 3 is a plan view illustrating a flat fluorescent lamp having a serpentine shaped discharge channel according to the first embodiment of the present invention.

FIG. 2 is a perspective view illustrating a flat fluorescent lamp having a serpentine shaped discharge channel according to the first embodiment of the present invention, and FIG. 3 is a plan view illustrating the flat fluorescent lamp having the serpentine shaped discharge channel according to the first embodiment of the present invention. FIGS. 1 and 2 illustrate the flat fluorescent lamp having the "n" number of the serpentine shaped discharge channels for preventing the reduction of the luminance and the rise of the discharge initiation voltage according to the first method.

A reference numeral "30" denotes a case where a rear substrate 12 and a front substrate 10 are adhered to each other, "16-1" denotes the first barrier rib, and "16-2" denotes the second barrier rib. A reference numeral "20-n" where "n" is the number of the discharge channels arranged from a center to one side denotes each of the discharge channels. In the discharge channels arranged within the flat fluorescent lamp, the both-side discharge channels are arranged to be symmetrical on the basis of the central discharge channel. Accordingly, the number of a total discharge channel is expressed as "2n−1". For example, when n=3, the number of the total discharge channels is 5.

A reference numeral 40-1 denotes a first discharge electrode including a first external electrode 42 and a third external electrode 46 bound together, and a reference numeral 40-2 denotes a second discharge electrode including a second external electrode 44 and a fourth external electrode (48) bound together.

The reference numeral "20-n" (n=1,2,3 . . . ) denotes each of the discharge channels. When n=1, the reference numeral "20-n" denotes the central discharge channel arranged at a center of the flat fluorescent lamp, and when n=2, it denotes the discharge channel arranged at the right or left of the central discharge channel. The "n" can increase or decrease depending on a size of the flat fluorescent lamp.

As shown in FIG. 2, "P1" denotes a horizontal pitch of a serpentine shaped width of the central discharge channel 20-1. The central discharge channel 20-1 represents a reference discharge channel. "P2" denotes a horizontal pitch of a serpentine shaped width of a second discharge channel 20-2 counted from the reference discharge channel 20-1, and "Pn" denotes a horizontal pitch of a serpentine shaped width of an nth discharge channel 20-n. The horizontal pitches of the serpentine shaped widths of the respective discharge channels have a size relationship of P1>P2> . . . >Pn.

According to the present invention, even in an opposite-side arrangement, the discharge channels have the same horizontal pitches as the respective serpentine shaped widths of the discharge channels where "n" is 2 or more, on the basis of the reference discharge channel 20-1. For example, the discharge channels of the opposite-side arrangement corresponding to the respective discharge channels where the "n" is 2 or more, excepting the reference discharge channel 20-1, are arranged to be symmetrical on the basis of the reference discharge channel 20-1.

As shown in FIGS. 2 and 3, the horizontal pitch of the serpentine shaped width gets smaller as going to the both-end discharge channel and accordingly, the discharge channel 20-n is shortened in length.

As a result, the discharge channel is shortened in length in a sequence of the reference discharge channel 20-1, the discharge channel 20-2, . . . , and the discharge channel 20-n in proportion to the horizontal pitch of the serpentine shaped width.

Figure 4:
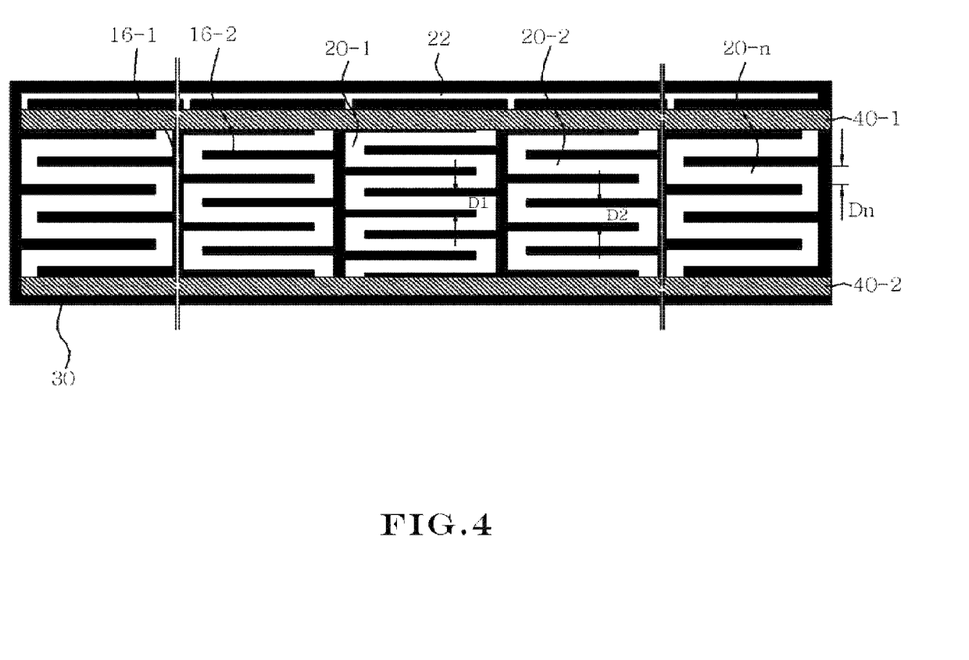
FIG. 4 is a plan view illustrating a flat fluorescent lamp having a serpentine shaped discharge channel according to the second embodiment of the present invention.

FIG. 4 is a plan view illustrating a flat fluorescent lamp having a serpentine shaped discharge channel according to the second embodiment of the present invention. Hereinafter, the second method for preventing the reduction of luminance and the rise of the discharge initiation voltage according to the present invention will be described.

In the second method, unlike the first method, serpentine shaped widths of the discharge channels have the same horizontal pitches whereas discharge channel widths have vertical pitches varied depending on a position of the discharge channel 20. The serpentine shaped widths of all the discharge cells have the same horizontal pitches.

In FIG. 4, "D1" denotes a vertical pitch of a discharge channel width of a reference discharge channel 20-1, "D2" denotes a discharge channel width of a discharge channel 20-2 next to the reference discharge channel 20-1, and "Dn" denotes an nth discharge channel 20-n counted from the reference discharge channel 20-1. Corresponding vertical pitches are given by a sum of the discharge channel width and a thickness of the second barrier ribs (16-2).

As shown in FIG. 4, the vertical pitches have a size relationship such that Dn>D2>D1. In other words, as going to the end, the vertical pitch of the discharge channel width gets larger and accordingly, the discharge channel is shortened in length.

FIGS. 5 to 9 illustrate flat fluorescent lamps having five (n=3) serpentine shaped discharge channels for preventing a reduction of luminance and a rise of discharge initiation voltage according to the third method of the present invention.

Figure 5:
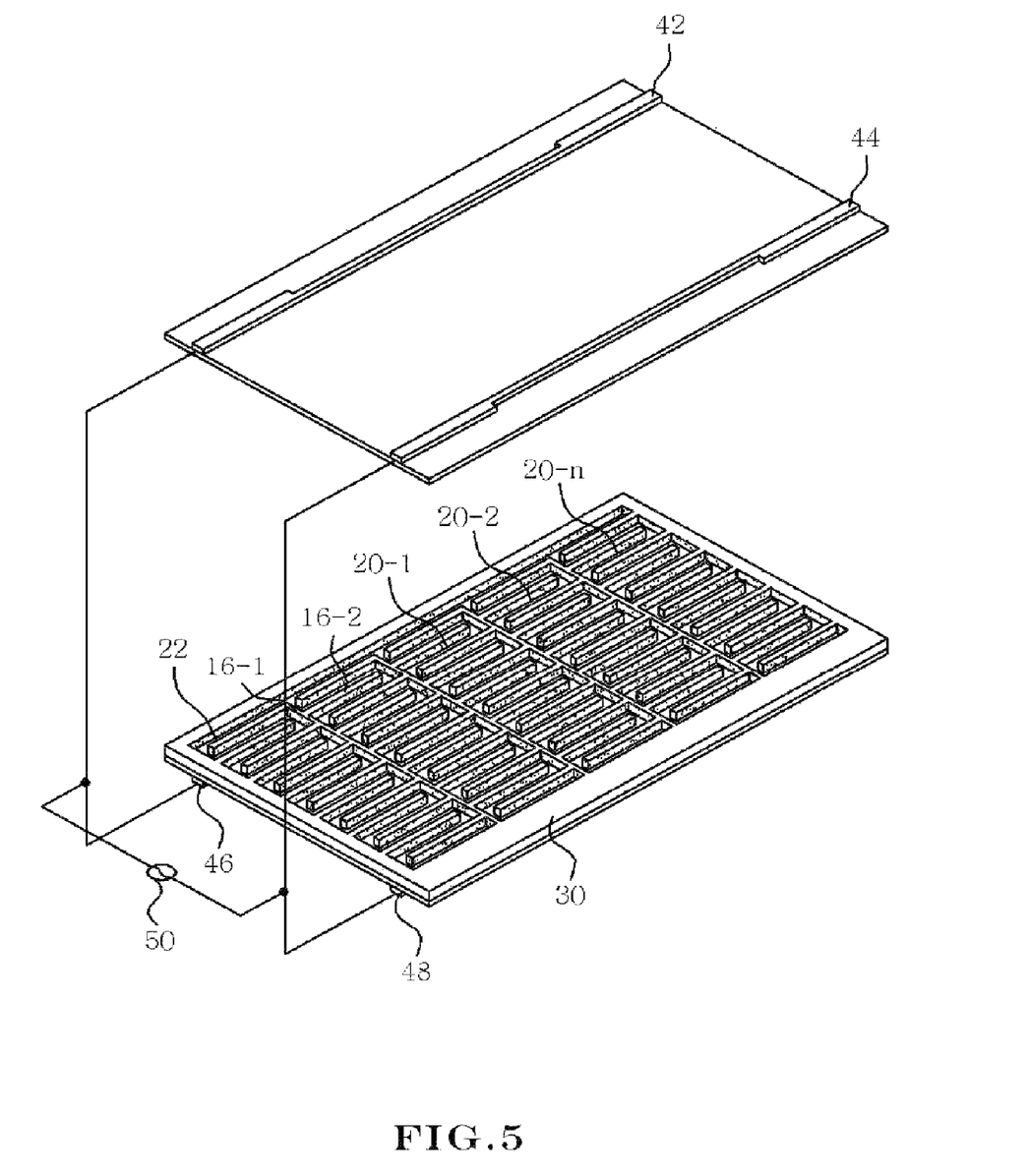
FIG. 5 is a perspective view illustrating a flat fluorescent lamp having a serpentine shaped discharge channel according to the third embodiment of the present invention.
Figure 6:
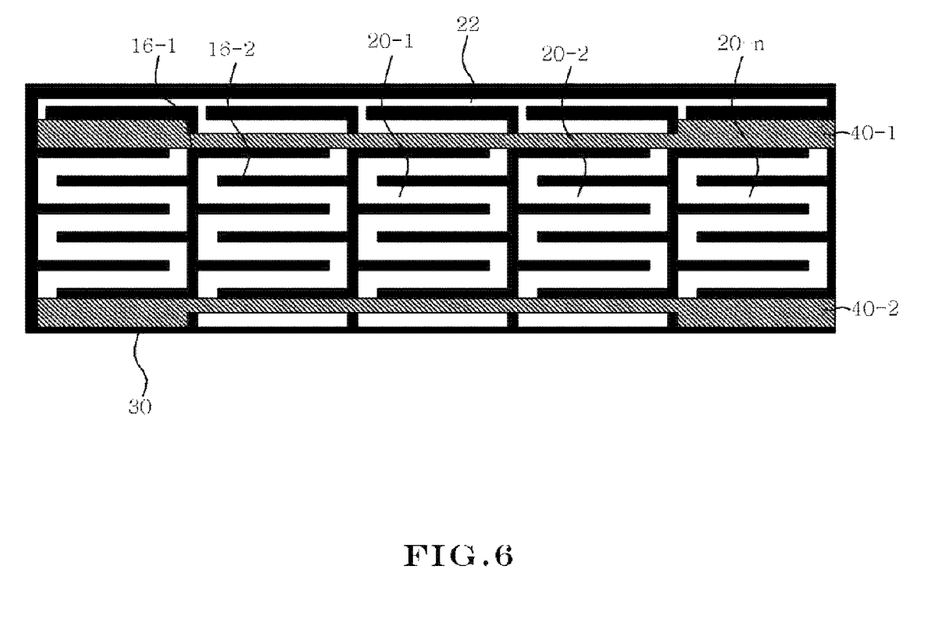
FIG. 6 is a plan view illustrating a flat fluorescent lamp having a serpentine shaped discharge channel according to the third embodiment of the present invention.

FIG. 5 is a perspective view illustrating the flat fluorescent lamp having the serpentine shaped discharge channel according to the third embodiment of the present invention, and FIG. 6 is a plan view illustrating the flat fluorescent lamp having the serpentine shaped discharge channel according to the third embodiment of the present invention. A discharge electrode disposed over the discharge channel is varied in width depending on a position of the discharge channel.

First, in FIG. 5, each of the discharge channels is arranged to have the same serpentine shaped width, the same discharge channel width, and the same discharge channel length whereas the discharge electrode is varied in width depending on the position of the discharge channel.

In detail, the electrode electrodes disposed across two discharge channels 20-3 arranged at both ends of the flat fluorescent lamp have widths greater than a width between second barrier ribs 16-2. The electrode electrodes disposed across a reference discharge channel 20-1, two next discharge channels arranged at both sides of the reference discharge channel 20-120-2, and three central discharge channels 20-1 and 2*20-2 (resulting from a symmetric structure) have the same widths as a discharge channel width.

If an electrode area gets wider, resistance can be reduced, thereby providing a greater discharge current to the discharge channel. Accordingly, the three central discharge channels of the flat fluorescent lamp can provide a normal discharge current, and two both-end discharge channels can provide a greater discharge current than the central discharge channel, thereby removing a dark region at both ends of the flat fluorescent lamp.

Figure 7:
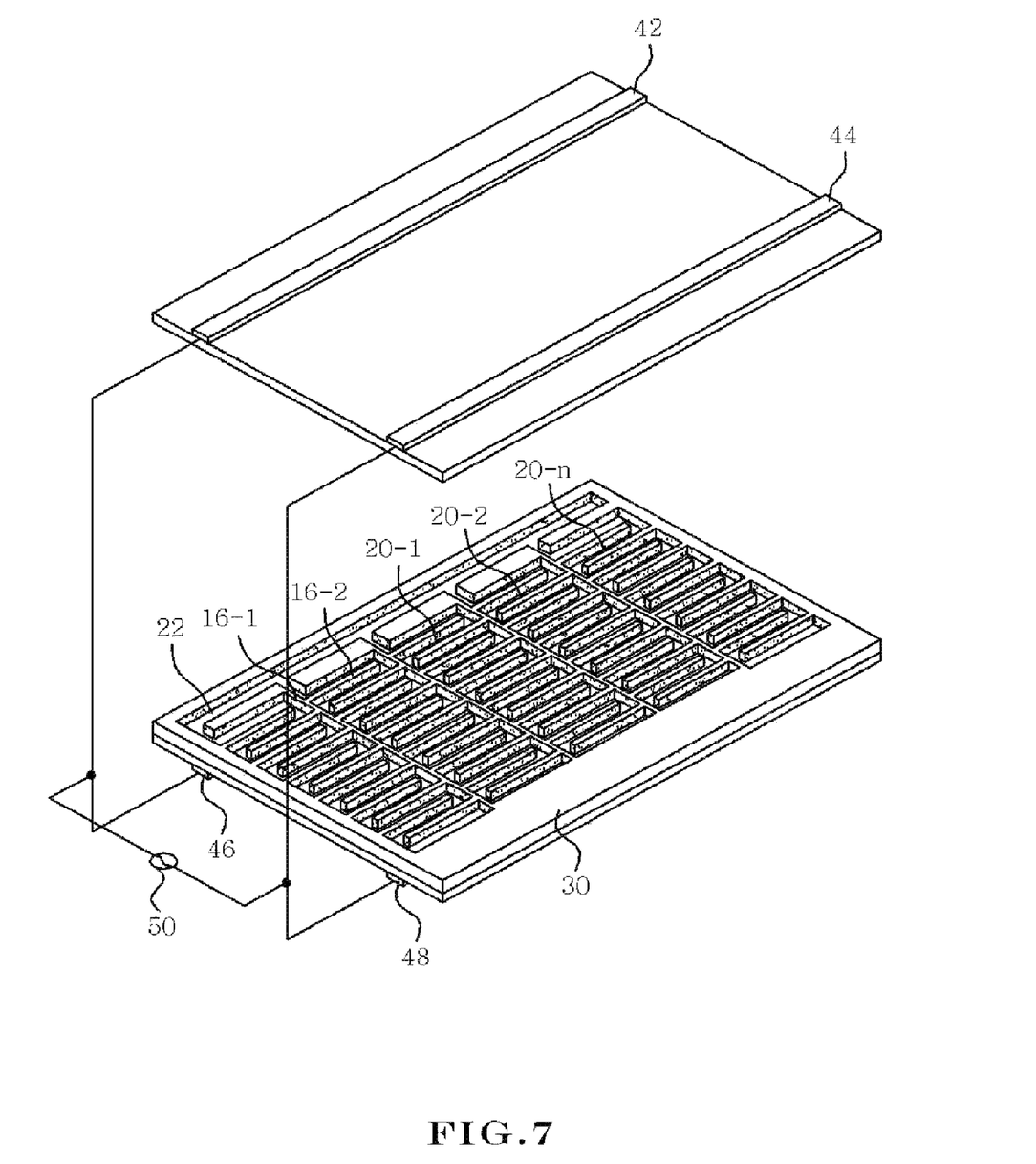
FIG. 7 is a perspective view illustrating a flat fluorescent lamp having a serpentine shaped discharge channel according to the fourth embodiment of the present invention.
Figure 8:
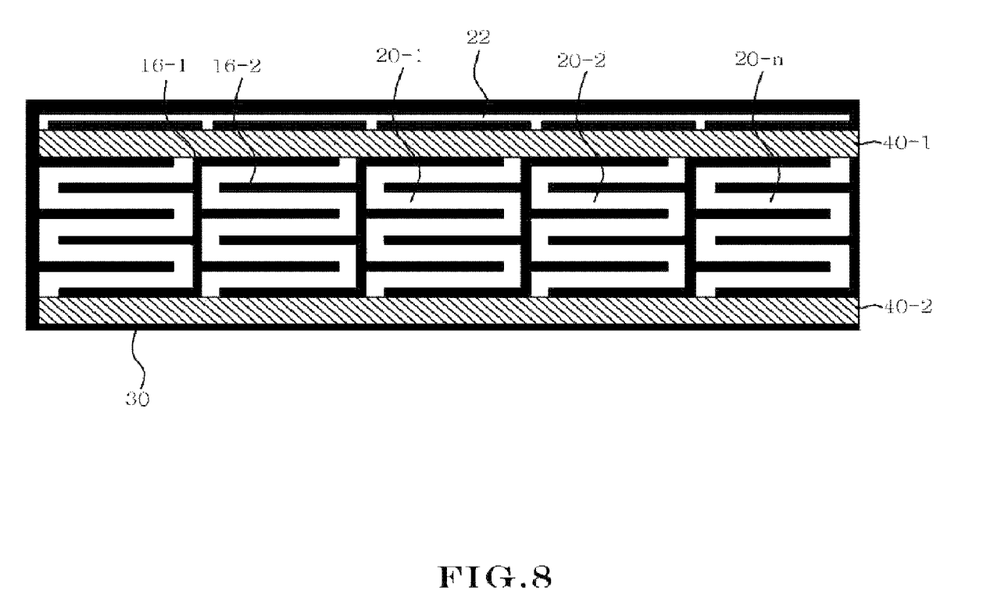
FIG. 8 is a plan view illustrating a flat fluorescent lamp having a serpentine shaped discharge channel according to the fourth embodiment of the present invention.
Figure 9:
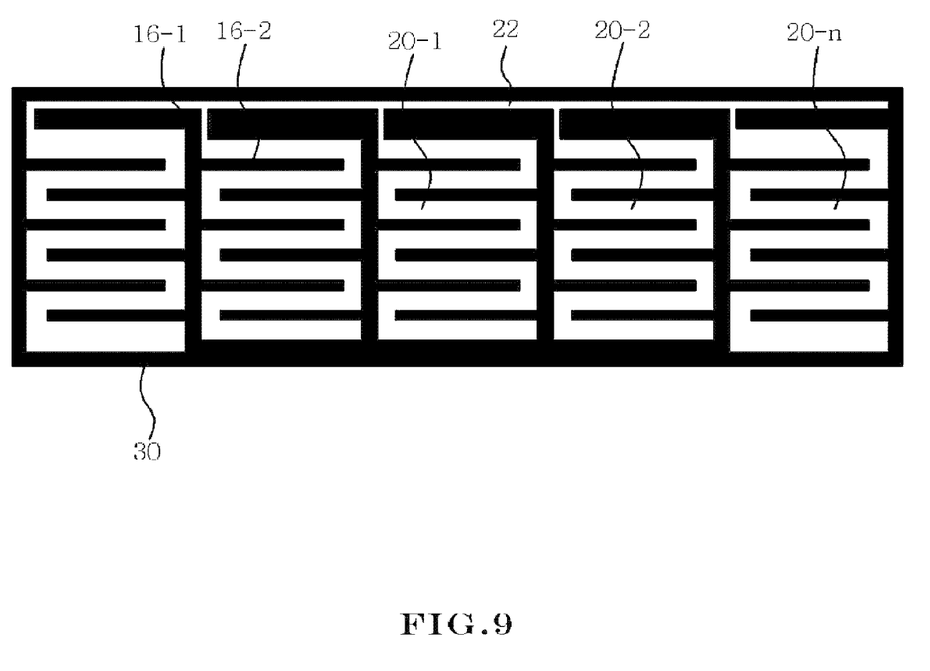
FIG. 9 is a plan view illustrating a rear substrate of a flat fluorescent lamp having a serpentine shaped discharge channel according to the fourth embodiment of the present invention.

FIG. 7 is a perspective view illustrating a flat fluorescent lamp having a serpentine shaped discharge channel according to the fourth embodiment of the present invention, FIG. 8 is a plan view illustrating the flat fluorescent lamp having the serpentine shaped discharge channel according to the fourth embodiment of the present invention, and FIG. 9 is a plan view illustrating a rear substrate of the flat fluorescent lamp having the serpentine shaped discharge channel according to the fourth embodiment of the present invention. Here, the flat fluorescent lamp is constructed to have the same effect using an electrode space, as that obtained by varying the width of the discharge electrode depending on the position of the discharge channel as in FIGS. 5 and 6.

Referring to FIGS. 7 to 9, all discharge channels of FIG. 7 have the same serpentine shaped widths and even the same discharge electrode widths.

On the contrary, in two discharge channels 20-3 arranged at both ends of the flat fluorescent lamp, an electrode space defined by an upper/lower sidewall 14 and a second barrier rib 16-2 has a larger width than a discharge channel width.

In the fourth embodiment of the present invention, even though the discharge electrode disposed in the electrode space of the discharge channel has a uniform width, the electrode space is varied in width depending on the position of the discharge channel. Therefore, the same effect as FIG. 4 can be obtained.

As a result of implementation of the present invention, the inventive flat fluorescent lamp can decrease the discharge initiation voltage at a percentage of about 10%, and can increase even the luminance uniformity at a percentage of about 10%.

As described above, the inventive flat fluorescent lamp has an advantage in that a structure having the plurality of independent serpentine-shaped discharge channels can minimize a difference of discharge initiation voltage and a difference of luminance between the discharge channels, caused by the barrier rib of the discharge channel and a characteristic of a discharge plasma.

Further, the inventive flat fluorescent lamp is advantageous in designing an inverter owing to the reduction of the discharge initiation voltage, and is advantageous in designing a luminance condition owing to enhancement of the luminance uniformity.

The above description is mainly based on the discharge channel, the electrode space, and the pitch between the barrier ribs having relation to the flat fluorescent lamp, and other well-known technologies are omitted but can be of course speculated and inferred by those skilled in the art.

Further, the above description is mainly based on the flat fluorescent lamp having specific shape and structure with reference to the attached drawings, but each feature of the present invention related with the structure of the discharge channel, the pitch between the barrier ribs, sizes of the electrode space and the electrode area can be variously deformed, modified, and combined by those skilled in the art and it should be understood that such deformation, modification and combination belong to a scope of the present invention.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A flat fluorescent lamp with a discharge uniformity, the lamp comprising:

a first substrate and a second substrate having discharge electrodes;

a sidewall corresponding to a frame of any one of the two substrates; and a plurality of serpentine shaped discharge channels defined by the sidewall, first barrier ribs, and second barrier ribs, and having serpentine shaped widths corresponding to horizontal pitches between the left/right sidewall and the first barrier rib and between the first barrier ribs, and having discharge channel widths corresponding to vertical pitches between the second barrier ribs, wherein the length of a serpentine shaped discharge channel is varied depending on the position of the serpentine shaped discharge channel within the flat fluorescent lamp, and wherein the position comprises a distance of the serpentine shaped discharge channel from a center line of the flat fluorescent lamp.

2. The lamp according to claim 1, wherein the serpentine shaped discharge channel depends on the serpentine shaped width in its length.

3. The lamp according to claim 2, wherein, among the serpentine shaped discharge channels, a central reference discharge channel has a larger serpentine shaped width than a both-end discharge channel.

4. The lamp according to claim 3, wherein the serpentine shaped width of the discharge channel has a smaller horizontal pitch as going to both ends centering on the reference discharge channel.

5. The lamp according to claim 1, wherein the serpentine shaped discharge channel depends on the discharge channel width in its length.

6. The lamp according to claim 5, wherein the reference discharge channel has a smaller discharge channel width than other discharge channels.

7. The lamp according to claim 5, wherein the discharge channel width gets larger as going to the both-end discharge channel from the reference discharge channel.

8. The lamp according to claim 6, wherein the discharge channel width gets larger as going to the both-end discharge channel from the reference discharge channel.

9. A flat fluorescent lamp with a discharge uniformity, the lamp comprising:

a first substrate and a second substrate having discharge electrodes;

a sidewall corresponding to a frame of any one of the two substrates; and a plurality of serpentine shaped discharge channels defined by the sidewall, first barrier ribs, and second barrier ribs, and having serpentine shaped widths corresponding to horizontal pitches between the left/right sidewall and the first barrier rib and between the first barrier ribs, and having a discharge space defined by the second barrier ribs, and having an electrode space having an electrode space width that is defined by the upper/lower sidewall and the second barrier rib and corresponds to a vertical pitch between the upper/lower sidewall and the second barrier rib, wherein a width of the discharge electrode is varied depending on a position of the discharge channel within the flat fluorescent lamp, and wherein the position comprises a distance of the serpentine shaped discharge channel from a center line of the flat fluorescent lamp.

10. The lamp according to claim 9, wherein the discharge electrode width is decided by the electrode space width of the electrode space.

11. The lamp according to claim 10, wherein the electrode space disposed at a central discharge channel has a smaller electrode space width than the electrode space disposed at a both-end discharge channel.

12. The lamp according to claim 9, wherein the discharge electrode disposed over a centeral discharge channel has a smaller discharge electrode width than the discharge electrode disposed over a both-end discharge channel.

* * * * *